(12) United States Patent
Ishikawa et al.

(10) Patent No.: US 7,600,625 B2
(45) Date of Patent: Oct. 13, 2009

(54) CENTRIFUGAL CLUTCH

(75) Inventors: Hideo Ishikawa, Saitama (JP); Michio Asumi, Saitama (JP); Hirokazu Komuro, Saitama (JP); Go Morita, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 11/585,101

(22) Filed: Oct. 24, 2006

(65) Prior Publication Data
US 2007/0095629 A1    May 3, 2007

(30) Foreign Application Priority Data
Oct. 27, 2005   (JP) ................. 2005-312740

(51) Int. Cl.
*F16D 43/18* (2006.01)
(52) U.S. Cl. .................... 192/105 CD; 192/30 V
(58) Field of Classification Search ........... 192/30 V, 192/103 B, 105 CD, 200, 209; 464/71, 72; 188/250 E
See application file for complete search history.

(56) References Cited

U.S. PATENT DOCUMENTS

2005/0178637 A1*   8/2005   Tsuchiya et al. ........ 192/105 CD

FOREIGN PATENT DOCUMENTS

| EP | 1 564 428 A1 | 8/2005 |
|---|---|---|
| JP | 2002-39227 A | 2/2002 |

* cited by examiner

*Primary Examiner*—Rodney H Bonck
(74) *Attorney, Agent, or Firm*—Birch, Stewart, Kolasch & Birch, LLP

(57) ABSTRACT

A centrifugal clutch includes a clutch weight in a plane perpendicular to a rotation axis of an input member for enabling friction fitting to an inside of a clutch housing. The clutch weight is turnably supported by a drive plate. A grooved portion is provided on a clutch weight in a position that is opposite to a drive plate. At least one end of grooved portion is closed and is formed in a turning direction of the clutch. A damping rubber supported by the drive plate abuts against an inside face of the grooved portion. The damping rubber is held in the grooved portion in a compressed state by being compressed between the drive plate and the clutch weight. The centrifugal clutch so configured effectively inhibits vibration of a clutch weight when the clutch is let in, and minimizes both the parts required and man-hours for assembly.

20 Claims, 8 Drawing Sheets

CENTRIFUGAL CLUTCH

CROSS-REFERENCE TO RELATED APPLICATION

The present application claims priority under 35 U.S.C. §119 to Japanese Patent Application No. 2005-312740, filed Oct. 27, 2005, the entire contents of which are hereby incorporated by reference.

BACKGROUND OF THE INVENTION

1. Field of the Invention

The invention relates to a centrifugal clutch provided with a drive plate revolved together with an input member, a clutch housing coaxially covering the drive plate so that the drive plate is revolved together with an output member and a clutch weight turnably supported by the drive plate so that the clutch weight can be turned for enabling friction fitting to an inside face of the clutch housing according to the action of centrifugal force caused by the revolution of the input member.

2. Description of Background Art

In such a centrifugal clutch, when the clutch weight starts to be frictionally fitted to the inside face of the clutch housing (hereinafter, this situation is called a state in which the clutch is let in), vibration called a judder in a plane perpendicular to the rotational axis of the input member is caused in the clutch weight, an occupant feels great vibration in the case of a centrifugal clutch for a vehicle, and noise is made. Then, in the related type centrifugal clutch, damping rubber for inhibiting vibration in the plane is used.

Further, the clutch weight is sometimes vibrated in a parallel direction with the axis of the input member in addition to vibration in the above-mentioned plane when the clutch is let in and in a centrifugal clutch disclosed in JP-A No. 2002-39227, noise and vibration when the clutch is let in are more effectively reduced by using another damping rubber for inhibiting the vibration of the clutch weight in the parallel direction with the axis of the input member in addition to the damping rubber for inhibiting the vibration in the plane.

However, in the centrifugal clutch disclosed in JP-A No. 2002-39227, two pieces of damping rubber are required with every clutch weight, the number of parts is increased, and the cost and the man-hour for assembly are increased.

SUMMARY AND OBJECTS OF THE INVENTION

The invention is made in view of such a situation and the object is to provide a centrifugal clutch in which the vibration when the clutch is let in of a clutch weight in a plane perpendicular to the rotational axis of an input member and in a parallel direction with the axis of the input member is effectively inhibited, reducing the number of parts, the cost and the man-hour for assembly.

To achieve the object, according to a first aspect of the present invention, a centrifugal clutch is provided with a drive plate revolved together with an input member, a clutch housing revolved together with an output member and coaxially covering the drive plate, and a clutch weight that can be frictionally fitted to an inside face of the clutch housing according to the action of centrifugal force caused by the revolution of the input member and is turnably supported by the drive plate. A grooved portion at least one end on the inside of the clutch housing of which is closed and which is formed in a turning direction of the clutch weight is provided to the side opposite to the drive plate of the clutch weight. In addition, a damping rubber supported by the drive plate with the damping rubber held between the drive plate and the clutch weight in a compressed state is arranged in the grooved portion so that the damping rubber abuts on an inside face of the grooved portion.

According to a second aspect of the present invention, the damping rubber has a circular outside periphery having an axis parallel with a turning axis of the clutch weight. The inside face of the grooved portion is at least provided with a pair of opposite sides formed in the shape of an arc with the turning axis of the clutch weight in the center at an interval longer than a diameter of the damping rubber in a compressed state between the drive plate and the clutch weight, and a semicircular closed end which has a radius longer than a radius of the damping rubber in the compressed state between the drive plate and the clutch weight and both ends in a circumferential direction of which range to each one end of both opposite sides.

According to the first aspect of the present invention, the vibration when the clutch is let in of the clutch weight in the direction parallel with the axis of the input member can be inhibited by holding the damping rubber supported by the drive plate in the compressed state between the drive plate and the clutch weight. As the damping rubber is arranged in the grooved portion at least one end on the inside of the clutch housing of which is closed, which is formed in the turning direction of the clutch weight and which is provided to the clutch weight so that the damping rubber abuts on the inside face of the grooved portion, the vibration when the clutch is let in of the clutch weight in the plane perpendicular to the rotation axis of the input member can be inhibited. That is, as the vibration when the clutch is let in of the clutch weight in the plane perpendicular to the rotation axis of the input member, and in the direction parallel with the axis of the input member can be effectively inhibited by one damping rubber for every clutch weight. As a result, the number of parts can be reduced, and the cost and man-hours needed for assembly can be reduced. In addition, processing for supporting dedicated damping rubber for inhibiting the vibration of the clutch weight in the direction parallel with the axis of the input member is not required to be applied to the clutch weight, and the processing man-hours of the clutch weight can be reduced.

According to the second aspect of the present invention, the damping rubber in the compressed state between the drive plate and the clutch weight is not resiliently touched to both opposite sides of the inside face of the grooved portion in a state in which no vibration is caused in the plane perpendicular to the axis of the input member. Thus, the manufacturing quality of the grooved portion can be moderated, a load required when the clutch weight is operated in the direction of the friction fitting to the inside face of the clutch housing is reduced, and the operation in the direction of the friction fitting of the clutch weight can be smoothed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
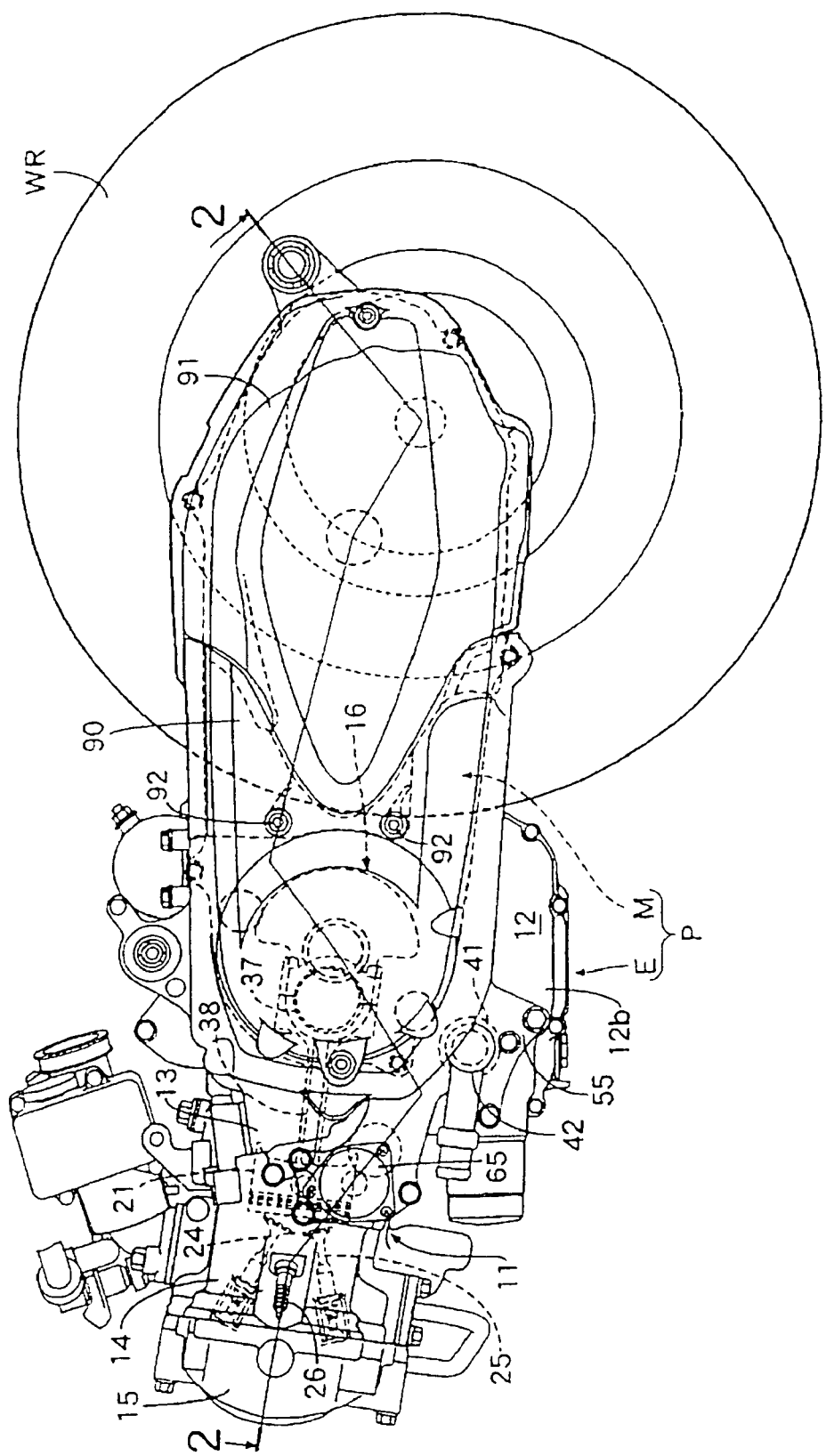
FIG. 1 is a side view showing a power unit mounted in a motorcycle and a rear wheel.
Figure 2:
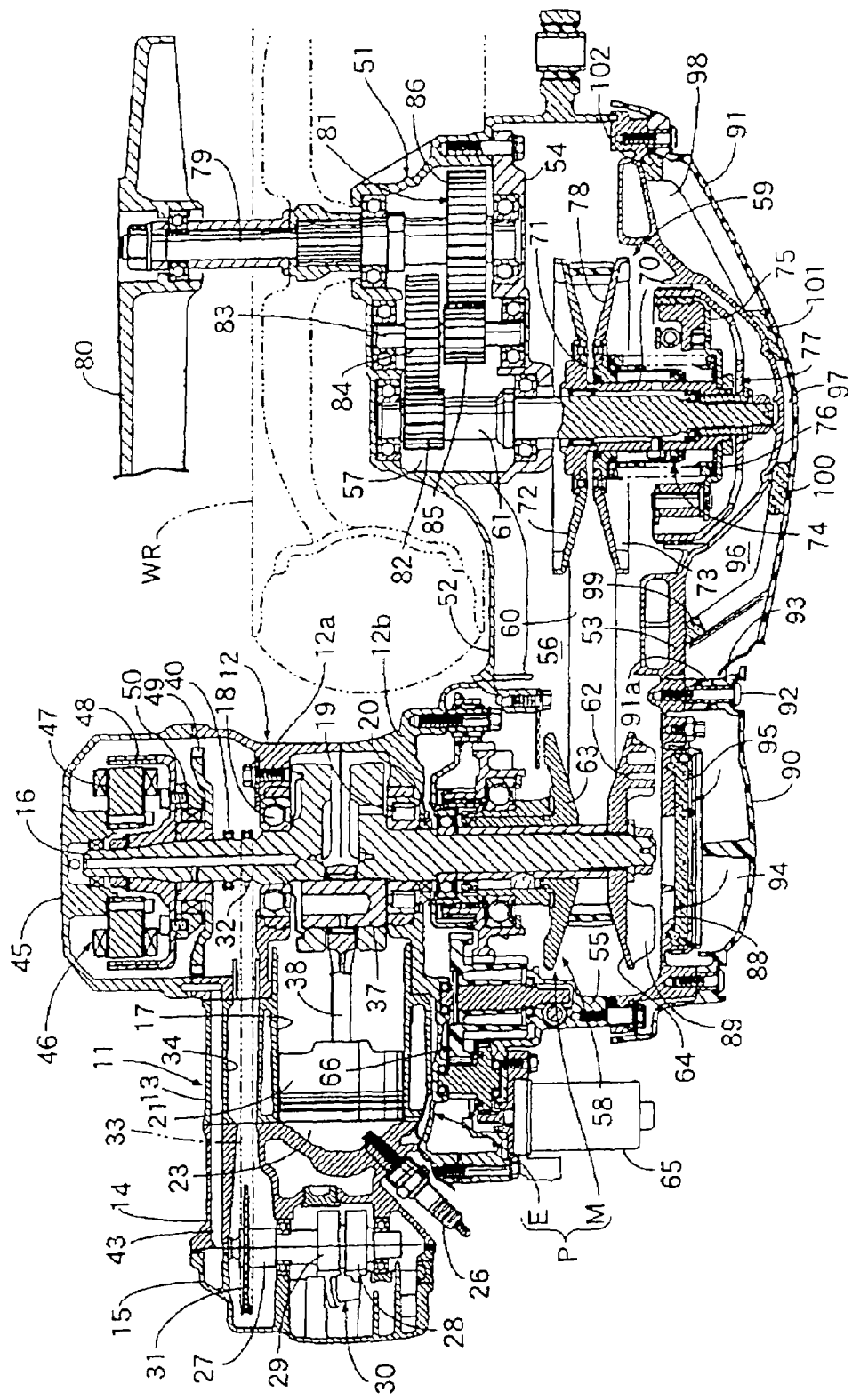
FIG. 2 is a cross-sectional view taken along a line 2-2 of FIG. 1.
Figure 3:
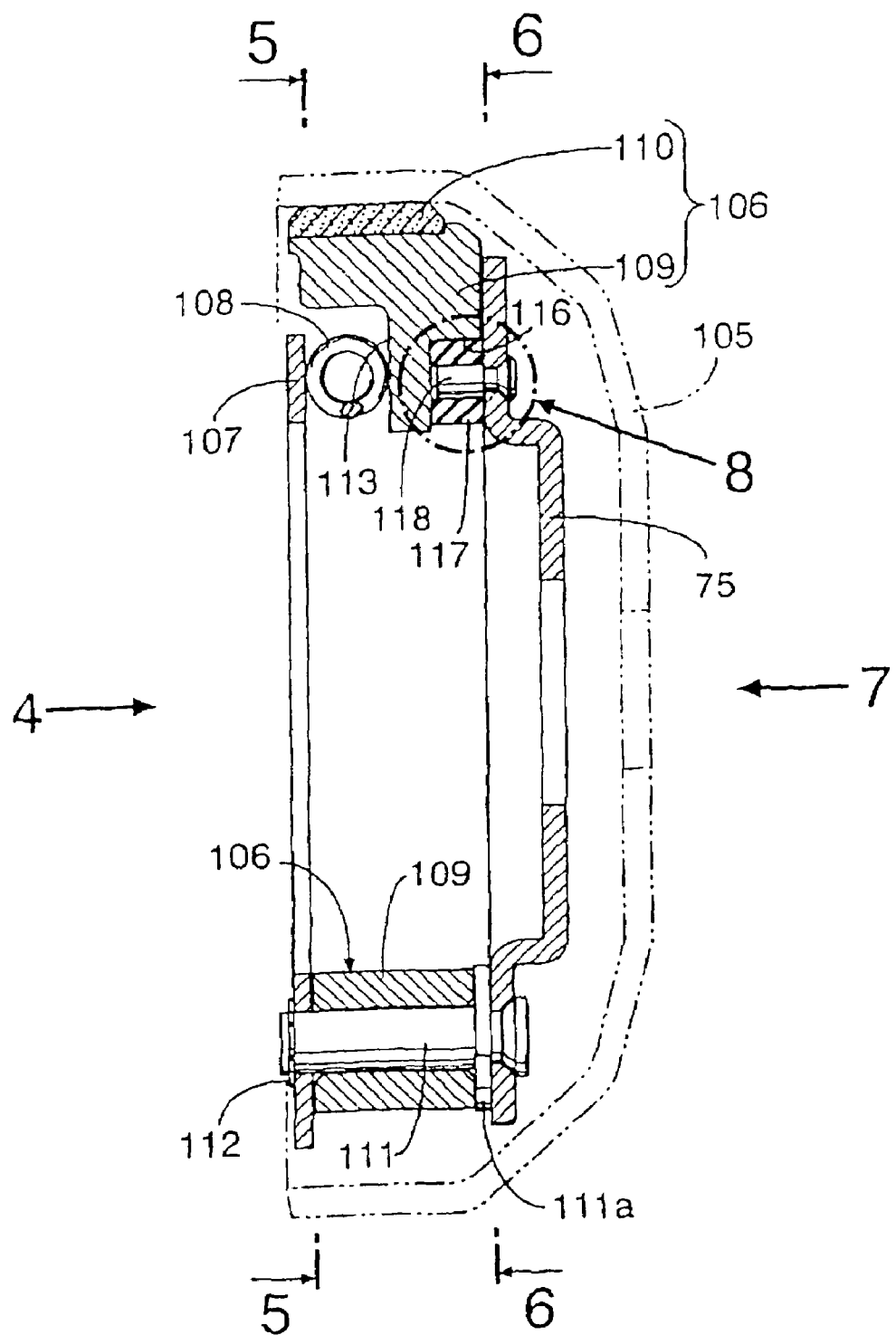
FIG. 3 is a longitudinal section showing a centrifugal clutch in a state where a clutch housing is omitted.
Figure 4:
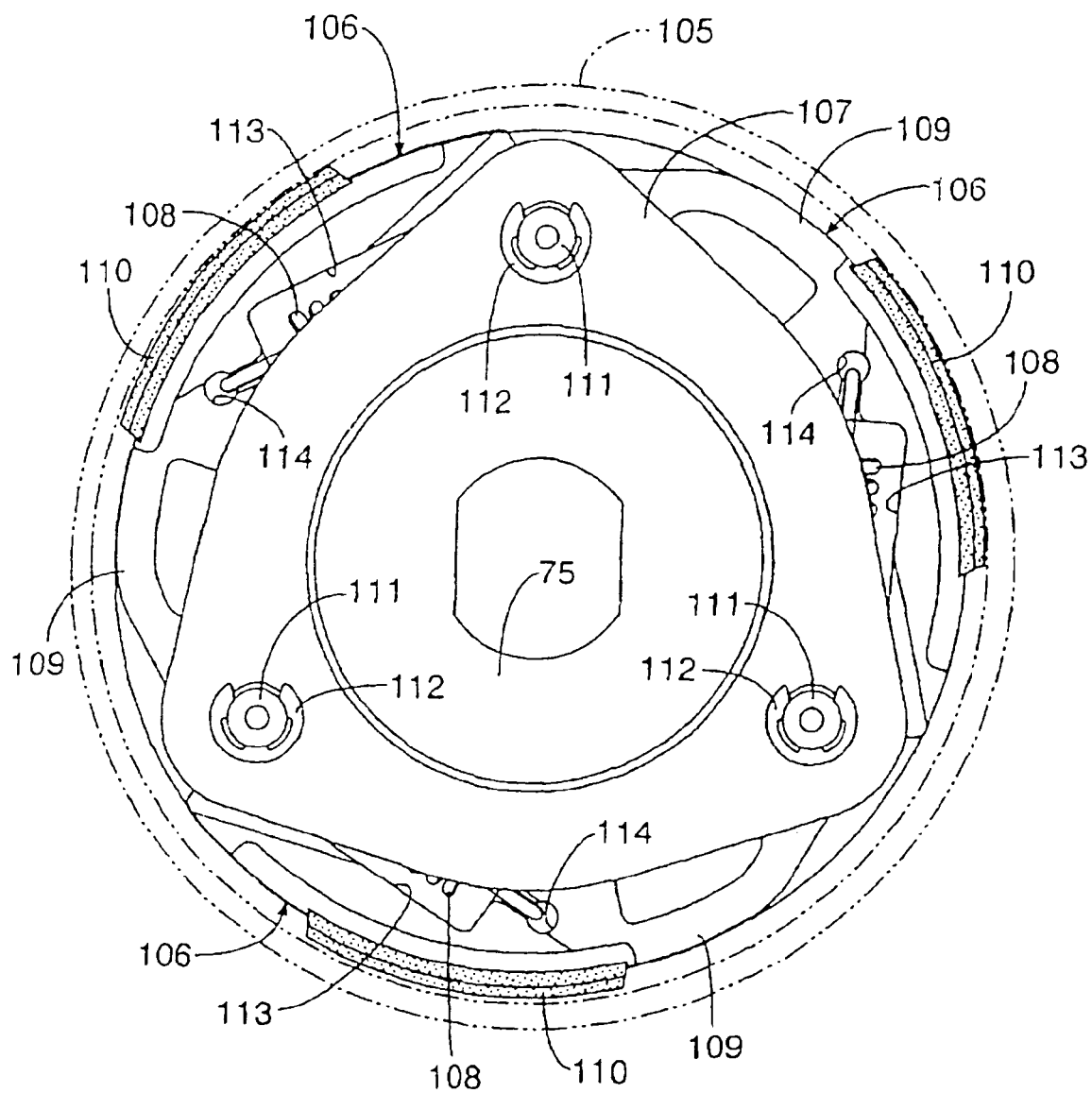
FIG. 4 is a view taken from an arrow 4 of FIG. 3.
Figure 5:
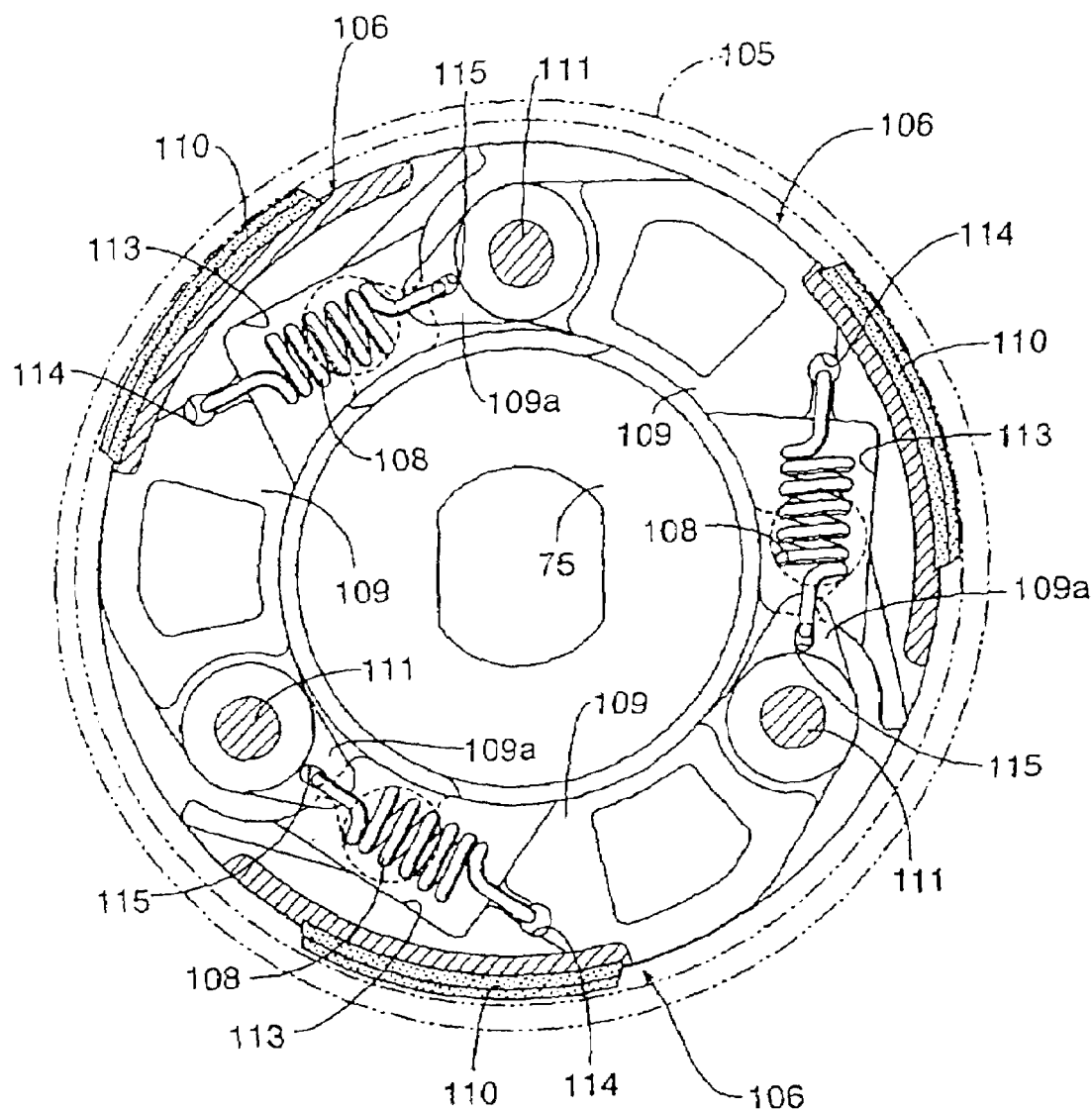
FIG. 5 is a cross-sectional view taken along a line 5-5 of FIG. 3.
Figure 6:
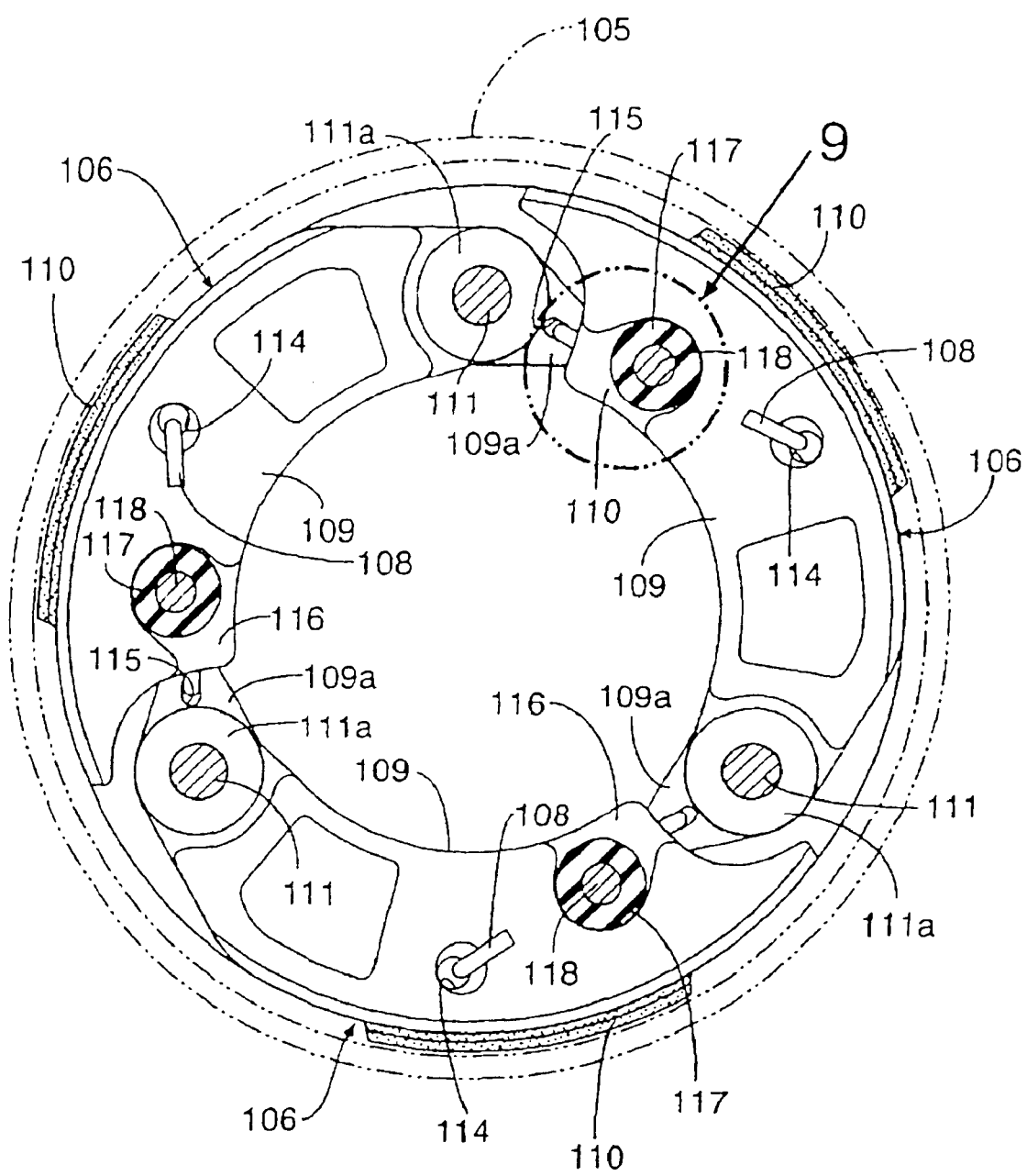
FIG. 6 is a cross-sectional view taken along a line 6-6 of FIG. 3.
Figure 7:
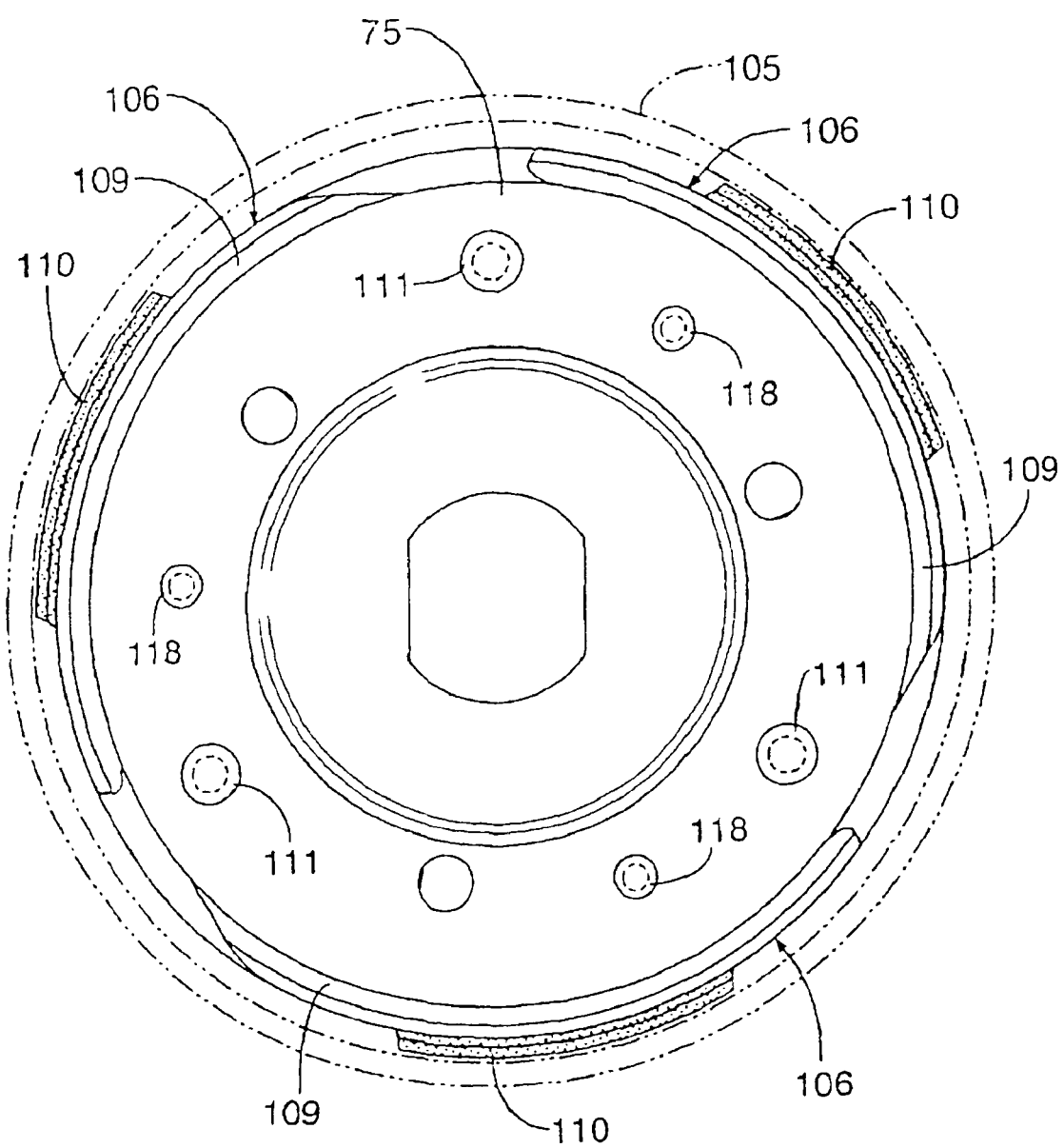
FIG. 7 is a view taken from an arrow 7 of FIG. 3.

First as shown in FIGS. 1 and 2, the power unit P configured by an engine E arranged in front of the rear wheel WR and a V-belt continuously variable transmission M provided between the engine E and the rear wheel WR is mounted on a body frame (not shown) of the motorcycle which is a scooter type, and the rear wheel WR arranged on the right side of the rear of the power unit P is supported by the rear of the power unit P.

A body 11 of the engine E is provided with a crankcase 12 that rotatably supports a crankshaft 16 having a rotation axis parallel with a rotation axis of the rear wheel WR, a cylinder block 13 connected to the crankcase 12, a cylinder head 14 connected to the cylinder block 13 on the reverse side to the crankcase 12 and a head cover 15 connected to the cylinder head 14 on the reverse side to the cylinder block 13.

The cylinder block 13 is arranged so that the axis of a cylinder bore 17 provided to the cylinder block 13 is substantially horizontal in a longitudinal direction of the motorcycle with the axis of the cylinder bore directed slightly upward toward the front. The crankcase 12 is formed by a pair of case halves 12a, 12b connected by a plane including the axis of the cylinder and perpendicular to the axis of the crankshaft 16, a ball bearing 18 is inserted between one case half 12a of both case halves 12a, 12b and the crankshaft 16, and a roller bearing 19 and an annular sealing member 20 arranged outside the roller bearing 19 are inserted between the other case half 12b and the crankshaft 16.

A piston 21 is slidably fitted into the cylinder bore 17 and the crankshaft 16 is coupled to the piston 21 via a crankpin 37 and a connecting rod 38. A combustion chamber 23 is formed between the cylinder head 14 and the piston 21, and an intake valve 24 for controlling intake air to the combustion chamber 23 and an exhaust valve 25 for controlling exhaust gas from the combustion chamber 23 are arranged in the cylinder head 14 so that the valves form a substantial V type on a projection drawing onto the plane perpendicular to the rotation axis of the crankshaft 16. Further, an ignition plug 26 opposite to the combustion chamber 23 is attached to the left side of the cylinder head 14 with the ignition plug directed toward the front in a traveling direction of the motorcycle.

A valve system 30 including a cam shaft 27 having an axis parallel with the axis of the crankshaft 16, rotatably supported by the cylinder head 14 and provided with an intake cam 28 and an exhaust cam 29 is housed between the cylinder head 14 and the head cover 15 so that the intake valve 24 and the exhaust valve 25 can be opened and closed.

A driven sprocket 31 is fixed to one end of the cam shaft 27. In the meantime, a first driving sprocket 32 is fixed in a position corresponding to the driven sprocket 31 outside the ball bearing 18 on the crankshaft 16, an endless cam chain 33 is wound onto the first driving sprocket 32 and the driven sprocket 31, and the cam chain 33 is housed in a chain chamber 34 formed across the cylinder block 13, the cylinder head 14 and the head cover 15 so that the cam chain can be run. The cam shaft 27 is rotated by the first driving sprocket 32, the driven sprocket 31 and the cam chain 33 with a half of a number of revolutions of the crankshaft 16.

A second driving sprocket 40 is fixed to the crankshaft 16 outside the first driving sprocket 31. In the meantime, an oil pump 41 (see FIG. 1) for pumping oil from a lower part of the crankcase 12 and a cooling water pump 42 (see FIG. 1) for circulating cooling water in a cooling jacket 43 provided to the cylinder block 13 and the cylinder head 14 are coaxially provided in the lower part of the crankcase 12, and rotational power is transmitted to the oil pump 41 and the cooling water pump 42 from the second driving sprocket 40 via a chain (not shown).

A generator 46 provided with a stator 47 fixed to a right cover 45 attached to the right side of the crankcase 12 and an outer rotor 48 fixed to the crankshaft 16 so that the outer rotor encircles the stator 47 is arranged outside the second driving sprocket 40.

A driven gear 49 coaxially encircling the crankshaft 16 and supported by the crankshaft 16 so that the driven gear can be relatively rotated is arranged between the second driving sprocket 40 and the outer rotor 48 and is coupled to the outer rotor 48 via a one-way clutch 50. Rotational power from a starting motor not shown can be input to the driven gear 49, when the engine E is started, driving force from the starting motor is transmitted to the crankshaft 16, and after the engine E is started, motive power from the crankshaft 16 is never transmitted to the side of the starting motor by the action of the one-way clutch 50.

The V-belt continuously variable transmission M is housed in a housing 56 in a transmission case 51 covering a part of the body 11 of the engine from the side, articulated with the body 11 and extended to the left side of the rear wheel WR, the transmission case 51 is configured by an inside case 52 integrated with the case half 12b of the pair of case halves 12a, 12b forming the crankcase 12, an outside case 53 covering the inside case 52 from the outside, a lid plate 54 fastened to the rear of the inside case 52 in the outside case 53, and a speed reducing gear case 55 put between the inside case 52 and the front of the outside case 53, and a gear case 57 isolated from the housing 56 is formed between the inside case 52 and the lid plate 54.

The V-belt continuously variable transmission M is configured by a drive pulley 58 installed at the other end of the crankshaft 16 as an input shaft protruded from the crankcase 12 into the housing 56, a driven pulley 59 installed on an output shaft 61 having an axis parallel with the crankshaft 16 and rotatably supported by the inside case 52 and the lid plate 54, and an endless V-belt 60 for transmitting motive power from the drive pulley 58 to the driven pulley 59.

The drive pulley 58 is provided with a fixed pulley half 62 fixed to the crankshaft 16 and a movable pulley half 63 that can approach the fixed pulley half 62 and can be separated from the fixed pulley half 62. Power for driving the movable pulley half 63 axially to vary the width of a belt groove 64 formed between the fixed pulley half 62 and the movable pulley half 63 for winding the V-belt 60 is transmitted to the movable pulley half 63 from an electric motor 65 attached to the transmission case 51 via a speed reducing gear mechanism 66.

The driven pulley 59 is provided with an inner cylinder 70 coaxially encircling the output shaft 61 so that the output shaft can be relatively rotated, an outer cylinder 71 with which the inner cylinder 70 is slidably engaged so that the relative turning around the axis and the axial relative movement are possible. The driven pulley is also provided with a fixed pulley half 72 fixed to the inner cylinder 70, a movable pulley half 73 fixed to the outer cylinder 71 opposite to the fixed pulley half 72, a torque cam mechanism 74 provided between the inner cylinder 70 and the outer cylinder 71 for making an axial component of force act between both pulley halves 72, 73 according to relative rotational phase difference between the movable pulley half 73 and the fixed pulley half 72, and a coil spring 76 for elastically energizing the movable pulley half 73 toward the fixed pulley half 72. The V-belt 60 is wound onto a belt groove 78 formed between the fixed pulley half 72 and the movable pulley half 73.

A centrifugal clutch 77 turned into a power transmission state when engine speed exceeds a set number of revolutions is provided between the inner cylinder 70 of the driven pulley 59 and the output shaft 61 and the coil spring 76 encircling the outer cylinder 71 is provided in a contracted state between a drive plate 75 forming a part of the centrifugal clutch 77 and coaxially connected to the inner cylinder 70 so that the relative turning is impossible of the movable pulley half 73.

An interval between the fixed pulley half 72 and the movable pulley half 73 in the driven pulley 59 is determined depending upon balance among axial force generated by the torque cam mechanism 74, axial resilience generated by the coil spring 76 and force from the V-belt 60 that acts in a direction in which the interval between the fixed pulley half 72 and the movable pulley half 73 is widened. When a radius in which the V-belt 60 is wound onto the drive pulley 58 is increased by bringing the movable pulley half 63 of the drive pulley 58 close to the fixed pulley half 62, a radius in which the V-belt 60 is wound onto the driven pulley 59 is reduced.

An axle 79 of the rear wheel WR is rotatably supported by the lid plate 54 and the inside case 52, an end of the axle 79 protruded from the transmission case 51 is connected to the body 11 of the engine, and is rotatably supported by an arm 80 arranged on the right side of the rear wheel WR.

A speed reducing gear train 81 provided between the output shaft 61 and the axle 79 is housed in the gear case 57. The speed reducing gear train 81 includes a first gear 82 provided to the output shaft 61, a second gear 84 provided to an intermediate shaft 83 parallel with the output shaft 61 and the axle 79 and rotatably supported by the inside case 52 and the lid plate 54 and engaged with the first gear 82, a third gear 85 provided to the intermediate shaft 83, and a fourth gear 86 engaged with the third gear 85 and provided to the axle 79.

An outside air intake 88 for taking cooling air in the housing 56 is provided to a side wall of a part opposite to the drive pulley 58 of the outside case 53 of the transmission case 51 and a cooling fan 89 for dispersing the cooling air taken from the outside air intake 88 in the housing 56 is integrated with the periphery of the fixed pulley half 62 of the drive pulley 58.

An outside face of the transmission case 51 is covered with a case cover 90 and an acoustic cover 91, the case cover 90 is fastened to the outside case 53 of the transmission case 51 in a plurality of locations so that the case cover covers an outside face of a front half including a part where the outside air intake 88 is arranged of the transmission case 51, and the acoustic cover 91 is fastened to the outside case 53 of the transmission case 51 in a plurality of locations so that the acoustic cover covers an outside face of a rear half on the side corresponding to the driven pulley 59 of the transmission case 51.

In addition, the case cover 90 and the acoustic cover 91 are attached to the transmission case 51 so that they cover a front edge of the acoustic cover 91 at a rear edge of the case cover 90, and the rear of the case cover 90 and the front of the acoustic cover 91 are jointly fastened to the transmission case 51 by screw members 92 with two bosses 91a provided to the front of the acoustic cover 91 held between the rear of the case cover 90 and the transmission case 51. In addition, an intake 93 open to the rear side is formed between the rear edge of the case cover 90 and the front edge of the acoustic cover 91, and an air intake chamber 94 communicating with the intake 93 is formed between the case cover 90 and the transmission case 51.

A filter 95 is attached to the outside face of the transmission case 51 so that the outside air intake 88 is closed from the side of the air intake chamber 94, outside air taken from the intake 93 into the air intake chamber 94 is purified by passing the filter 95, and is taken in the housing 56.

Four acoustic materials 99, 100, 101, 102 for example are arranged between the transmission case 51 and the acoustic cover 91 so that space between the transmission case 51 and the acoustic cover 91 is partitioned into a plurality of, for example three closed spaces 96, 97, 98.

Each acoustic material 99 to 102 is formed in the shape of a string by cutting a urethane sheet and one surface of each acoustic material 99 to 102 is bonded to either of the transmission case 51 or the acoustic cover 91, an inner face of the acoustic cover 91 in this embodiment by an adhesive.

As described above, noise emitted from the transmission case 51 is inhibited because the space between the transmission case 51 and the acoustic cover 91 is partitioned into the plurality of closed spaces 96 to 98 by the acoustic materials 99 to 102 and the noise is absorbed by the acoustic materials 99 to 102 arranged between the transmission case 51 and the acoustic cover 91. Besides, the noise is inhibited because the resonance of the noise is prevented from being caused in the plurality of closed spaces 96 to 98 formed between the transmission case 51 and the acoustic cover 91 and sufficient noise preventing effect can be acquired with simple structure.

As shown in FIGS. 3 to 7, the centrifugal clutch 77 is configured according to the invention, and is provided with a disc-like drive plate 75 connected coaxially with the inner cylinder 70 which is a input member so that the drive plate cannot be relatively revolved, and a bowl like clutch housing 105 connected coaxially with the output shaft 61 which is an output member so that the clutch housing cannot be relatively revolved for coaxially covering the drive plate 75. The centrifugal clutch is also provided with clutch weights 106, 106, 106 which can be frictionally fitted to a plurality of locations, for example to three locations arranged at an equal interval in a circumferential direction of the clutch housing 105 according to the action of centrifugal force caused by the revolution of the inner cylinder 70 and are supported by the drive plate 75. Also provided are a ring-type side plate 107 holding these clutch weights 106 between the side plate and the drive plate 75, and clutch springs 108, 108, 108 provided between the adjacent clutch weights 106, 106 in the circumferential direction of the clutch housing 105 to exercise the spring for pressing the clutch weights 106 on the side where friction fitting to an inside face of the clutch housing 105 is released.

The clutch weight 106 is formed by sticking friction material 110 which can be frictionally fitted to the inside face of the clutch housing 105 on a weight member 109 made of metallic material in the shape of a shoe. A spindle 111 planted on the drive plate 75 pierces one end of the weight member 109 along the circumference of the clutch housing 105 and the side plate 107 which abuts on the weight member 109 from the reverse side to the drive plate 75. The weight member 109 is held between a supporting flange 111a provided to the base of the spindle 111 and the side plate 107 and a snap ring 112 which abuts on and which is fitted to the side plate 107 is installed at the end of the spindle 111 protruded from the side plate 107.

A recessed portion 113 for housing the clutch spring 108 arranged between the weight member 109 and the side plate 107 is provided on the other end side of the weight member 109. A fitting hole 114 for fitting one end of the clutch spring 108 is provided in an intermediate part of the weight member 109 and a fitting hole 115 for fitting the other end of the clutch spring 108 is provided to an arm 109a integrated with one end of the weight member 109.

That is, the clutch weights 106 arranged between the drive plate 75 and the side plate 107 can be turned around the axis of the spindle 111 and when centrifugal force that acts on each clutch weight 106 according to the revolution of the drive plate 75 exceeds the spring force of the clutch spring 108 that acts on each clutch weight 106, each clutch weight 106 is turned in a direction in which the friction material 110 is slid on the inside face of the clutch housing 106.

A grooved portion 116 in a turning direction of the clutch weight 106 is provided to the side opposite to the drive plate 75 on the other end side of the weight member 109 in the clutch weight 106 and a damping rubber 117 supported by the drive plate 75 with the damping rubber held between the drive plate 75 and the weight member 109 in a compressed state is arranged in the grooved portion 116 so that the damping rubber 117 abuts on an inside face 116a of the grooved portion 116.

Figure 8:
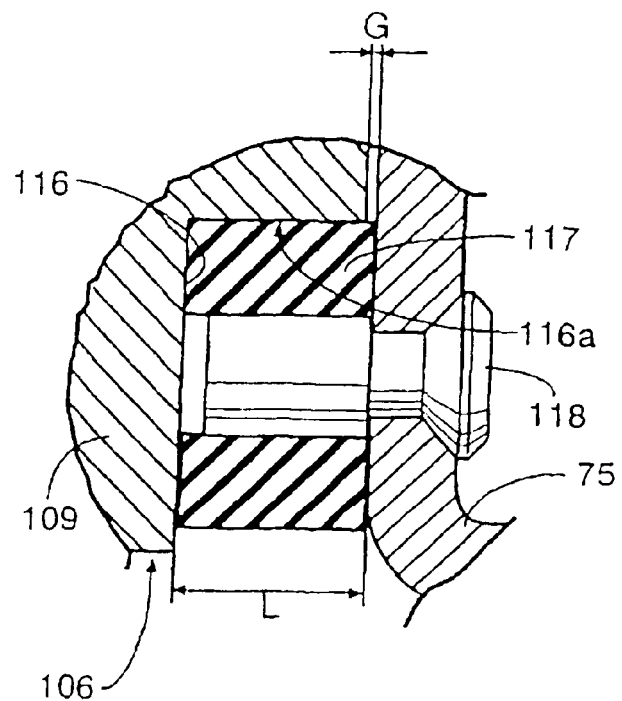
FIG. 8 is an enlarged view taken from an arrow 8 of FIG. 3.

As shown in FIG. 8, the damping rubber 117 has a circular outside periphery having an axis parallel with a turning axis of the clutch weight 106, that is, an axis of the spindle 111, is formed cylindrically, and is supported by a supporting pin 118 planted on the drive plate 75. In addition, when distance between the grooved portion 116 of the weight member 109 held between the drive plate 75 and the side plate 107 and the drive plate 75 is L, the axial length of the damping rubber 117 in a natural state in which no external force acts is set so that the axial length is longer than the distance L, and the damping rubber 117 is held between the drive plate 75 and the weight member 109 in a compressed state so that a gap G is made between the drive plate 75 and the weight member 109.

Figure 9:
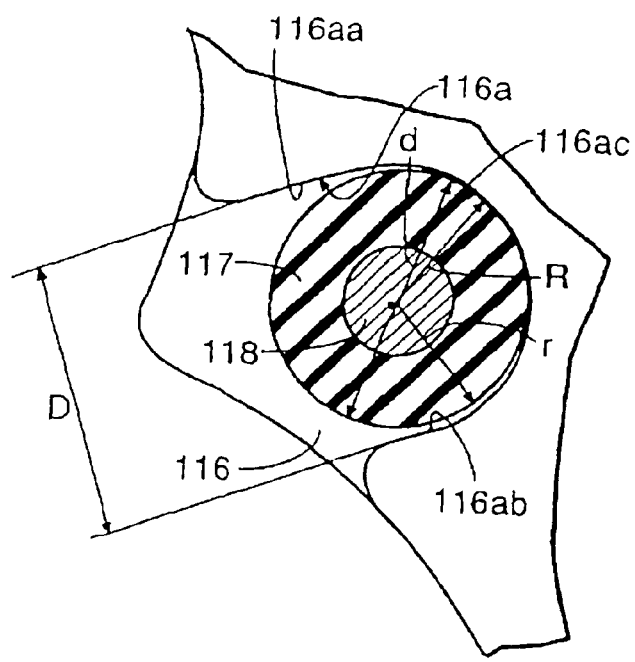
FIG. 9 is an enlarged view taken from an arrow 9 of FIG. 6.

As also shown in FIG. 9, the grooved portion 116 is formed so that at least one end on the inside of the clutch housing 105 is closed and is formed in a turning direction of the clutch weight 106, and in this embodiment, the grooved portion 116 is formed so that one end on the inside of the clutch housing 105 is closed and the other end is open.

In addition, an inside face 116a of the grooved portion 116 is at least provided with a pair of opposite sides 116aa, 116ab formed in the shape of an arc with the turning axis of the clutch weight 106. That is, the axis of the spindle 111 in the center at an interval D longer than a diameter d of the damping rubber 117 compressed between the drive plate 75 and the clutch weight 106 and a semicircular closed end 116ac which has a radius R longer than a radius r of the damping rubber 117 compressed between the drive plate 75 and the clutch weight 106 and both ends in a circumferential direction of which range to each one end of both opposite sides 116aa, 116ab. In this embodiment in which the other end of the grooved portion 116 is open, each other end of both opposite sides 116aa, 116ab is curved so that each other end smoothly ranges to an inside side of the weight member 109 and the side of one end.

Next, to explain the action of this embodiment, as the damping rubber 117 supported by the drive plate 75 via the supporting pin 118 is held between the drive plate 75 and the clutch weight 106 in the compressed state in the centrifugal clutch 77, the vibration when the clutch is let in of the clutch weight 106 in a direction parallel with an axis of the inner cylinder 70 can be inhibited. As the grooved portion 116 at least one end on the inside of the clutch housing 105 of which is closed and which is formed in the turning direction of the clutch weight 106 is provided to the side opposite to the drive plate 75 of the clutch weight 106 and the damping rubber 117 is arranged in the grooved portion 116 so that the damping rubber abuts on the inside face 116a of the grooved portion 116, the vibration when the clutch is let in of the clutch weight 106 in the plane perpendicular to the rotation axis of the inner cylinder 70 can be inhibited.

That is, as the vibration when the clutch is let in of the clutch weight 106 in the plane perpendicular to the rotation axis of the inner cylinder and in the direction parallel with the axis of the inner cylinder 70 can be effectively inhibited by one damping rubber 117 every clutch weight 106 and the number of parts can be reduced, the cost and a man-hour in assembly can be reduced. In addition, processing for supporting dedicated damping rubber for inhibiting the vibration of the clutch weight 106 in the direction parallel with the axis of the inner cylinder 70 is not required to be applied to the clutch weight 106 and a processing man-hour of the clutch weight 106 can be reduced.

The damping rubber 117 has the circular outside periphery having the axis parallel with the turning axis of the clutch weight 106, the inside face 116a of the grooved portion 116 is at least provided with the pair of opposite sides 116aa, 116ab formed in the shape of the arc with the turning axis of the clutch weight 106 in the center at the interval D longer than the diameter d of the damping rubber 117 in the compressed state between the drive plate 75 and the clutch weight 106 and the semicircular closed end 116ac which has the radius R longer than the radius r of the damping rubber 117 in the compressed state between the drive plate 75 and the clutch weight 106 and both ends in the circumferential direction of which range to each one end of both opposite sides 116aa, 116ab, the damping rubber 117 in the compressed state between the drive plate 75 and the clutch weight 106 is not resiliently touched to both opposite sides 116aa, 116ab of the inside face 116a of the grooved portion 116 in a state in which no vibration is caused in the plane perpendicular to the axis of the inner cylinder 70, the manufacturing quality of the grooved portion 116 can be moderated, a load required when the clutch weight 106 is operated in the direction of the friction fitting to the inside face of the clutch housing 105 is reduced, and the operation in the direction of the friction fitting of the clutch weight 106 can be smoothed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A centrifugal clutch including a drive plate revolved together with an input member, a clutch housing revolved together with an output member and coaxially covering the drive plate, and a clutch weight that is frictionally fitted to an inside face of the clutch housing according to an action of centrifugal force caused by revolution of the input member, the clutch weight being turnably supported by the drive plate, comprising;

a grooved portion of the clutch weight, at least one end of which on an inside of the clutch housing is closed, and which is formed along a turning direction of the clutch weight, is provided to a side of the clutch weight facing the drive plate; and a damping rubber supported by the drive plate with the damping rubber and being held between the drive plate and the clutch weight in a compressed state, said damping rubber being arranged in the grooved portion so that the damping rubber abuts on an inside face of the grooved portion, having a circular outside periphery, and having an axis parallel with a turning axis of the clutch weight, wherein an inside face of the grooved portion of the clutch weight includes at least:

a semicircular closed end portion having a radius (R); and a pair of opposite side portions that extend, respectively, from opposite ends of the semicircular closed end portion in a circumferential direction, the pair of opposite side portions being separated by an interval (D$\geq$2R), wherein when the damping rubber is disposed in the compressed state between the drive plate and the clutch plate, a diameter (d=2r) of the damping rubber is smaller than the interval (D$\geq$2R).

2. The centrifugal clutch according to claim 1, wherein:
the damping rubber has a circular outside periphery having an axis parallel with a turning axis of the clutch weight; and
wherein the clutch housing faces an outer side of the drive plate and the clutch weight faces an inner side of the clutch plate.

3. The centrifugal clutch according to claim 1, wherein the damping rubber is supported between the drive plate and the clutch weight by a supporting pin.

4. The centrifugal clutch according to claim 1, wherein the drive plate of the centrifugal clutch is connected coaxially with the input member so that the drive plate cannot be relatively revolved, and
wherein the clutch housing is connected coaxially with the output member so that the clutch housing cannot be relatively revolved.

5. The centrifugal clutch according to claim 1, wherein the input member is an inner cylinder, and the clutch housing is bowl-shaped.

6. The centrifugal clutch according to claim 1, wherein the clutch weight is a plurality of clutch weights frictionally fitted to a plurality of locations arranged at equal intervals in a circumferential direction of the clutch housing.

7. The centrifugal clutch according to claim 6, further comprising a ring-shaped side plate holding the clutch weight between the side plate and the drive plate, and clutch springs provided between the adjacent clutch weights in the circumferential direction of the clutch housing to exercise the springs for pressing the clutch weights on a side where friction fitting to an inside face of the clutch housing is released.

8. The centrifugal clutch according to claim 1, when a distance between the grooved portion of a weight member of the clutch weight held between the drive plate and a side plate and the drive plate is (L), an axial length of the damping rubber in a natural state in which no external force acts is set so that the axial length is longer than the distance (L), and the damping rubber is held between the drive plate and the weight member in a compressed state so that a gap (G) is made between the drive plate and the weight member.

9. The centrifugal clutch according to claim 1, further comprising a side plate that is substantially triangular in shape and extends parallel to the drive plate, the clutch weight being disposed between the side plate and the drive plate.

10. The centrifugal clutch according to claim 9, wherein the side plate and the drive plate are separated by at least one spindle.

11. A centrifugal clutch comprising;
a drive plate adapted to revolve together with an input member;
a clutch housing adapted to revolve together with an output member and coaxially covering the drive plate; and
a clutch weight frictionally fitted to an inside face of the clutch housing according to an action of centrifugal force caused by revolution of the input member, said clutch weight being turnably supported by the drive plate;
a grooved portion of the clutch weight is formed on a side of the clutch weight facing the drive plate, at least one end of the groove portion being closed and being formed along a turning direction of the clutch weight; and
a damping rubber supported by the drive plate with the damping rubber being held between the drive plate and the clutch weight in a compressed state, said damping rubber being arranged in the grooved portion so that the damping rubber abuts on an inside face of the grooved portion, having a circular outside periphery, and having an axis parallel with a turning axis of the clutch weight,
wherein an inside face of the grooved portion of the clutch weight includes at least:
a semicircular closed end portion having a radius (R); and
a pair of opposite side portions that extend, respectively, from opposite ends of the semicircular closed end portion in a circumferential direction, the pair of opposite side portions being separated by an interval (D $\geq$2R),
wherein when the damping rubber is disposed in the compressed state between the drive plate and the clutch plate, a diameter (d=2r) of the damping rubber is smaller than the interval (D $\geq$2R).

12. The centrifugal clutch according to claim 11, wherein:
the damping rubber has a circular outside periphery having an axis parallel with a turning axis of the clutch weight; and
the clutch housing faces an outer side of the drive plate and the clutch weight faces an inner side of the clutch plate.

13. The centrifugal clutch according to claim 11, wherein the damping rubber is supported between the drive plate and the clutch weight by a supporting pin inserted through the drive plate from a side facing the clutch housing.

14. The centrifugal clutch according to claim 13, wherein the supporting pin does not extend into the clutch weight.

15. The centrifugal clutch according to claim 11, wherein the drive plate of the centrifugal clutch is connected coaxially with the input member so that the drive plate cannot be relatively revolved, and
wherein the clutch housing is connected coaxially with the output member so that the clutch housing cannot be relatively revolved.

16. The centrifugal clutch according to claim 11, wherein the input member is an inner cylinder, and the clutch housing is bowl-shaped.

17. The centrifugal clutch according to claim 11, wherein the clutch weight is a plurality of clutch weights frictionally fitted to a plurality of locations arranged at equal intervals in a circumferential direction of the clutch housing.

18. The centrifugal clutch according to claim 17, further comprising a ring-shaped side plate holding the clutch weight between the side plate and the drive plate, and clutch springs provided between the adjacent clutch weights in the circumferential direction of the clutch housing to exercise the springs for pressing the clutch weights on a side where friction fitting to an inside face of the clutch housing is released.

19. The centrifugal clutch according to claim 11, when a distance between the grooved portion of a weight member of the clutch weight held between the drive plate and a side plate and the drive plate is (L), an axial length of the damping rubber in a natural state in which no external force acts is set so that the axial length is longer than the distance (L), and the damping rubber is held between the drive plate and the weight member in a compressed state so that a gap (G) is made between the drive plate and the weight member.

20. The centrifugal clutch according to claim 11, further comprising a side plate that is substantially triangular in shape and extends parallel to the drive plate, the clutch weight being disposed between the side plate and the drive plate.

* * * * *